United States Patent
Sun et al.

(10) Patent No.: US 12,180,922 B1
(45) Date of Patent: Dec. 31, 2024

(54) SCOUR PROTECTIVE DEVICE AROUND PILES WITH BIDIRECTIONAL FLOW POWER GENERATION

(71) Applicant: ZHEJIANG UNIVERSITY, Zhejiang (CN)

(72) Inventors: Yizhi Sun, Hangzhou (CN); Zhilin Sun, Hangzhou (CN); Jing Liu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/789,625

(22) Filed: Jul. 30, 2024

(51) Int. Cl.
| | |
|---|---|
| *F03B 17/06* | (2006.01) |
| *E01D 19/00* | (2006.01) |
| *E02B 17/00* | (2006.01) |
| *E02D 31/00* | (2006.01) |
| *H02K 7/18* | (2006.01) |

(52) U.S. Cl.
CPC .............. *F03B 17/06* (2013.01); *E01D 19/00* (2013.01); *E02B 17/0017* (2013.01); *E02D 31/00* (2013.01); *F05B 2220/705* (2020.08); *H02K 7/1807* (2013.01)

(58) Field of Classification Search
CPC ....... E01D 19/02; E01D 19/005; E01D 19/00; E02D 31/00; F03B 17/06; E02B 17/0017; F05B 2220/705; H02K 7/1807
See application file for complete search history.

(56) References Cited

U.S. PATENT DOCUMENTS

| | | | | |
|---|---|---|---|---|
| 4,717,286 A | * | 1/1988 | Loer | ....................... E02B 17/00 |
| | | | | 405/74 |
| 2011/0016644 A1 | * | 1/2011 | Jo | ....................... E02B 17/0017 |
| | | | | 14/75 |

(Continued)

FOREIGN PATENT DOCUMENTS

| | | |
|---|---|---|
| CN | 202148973 U | 2/2012 |
| CN | 107237718 A | 10/2017 |

(Continued)

OTHER PUBLICATIONS

Notice Of Allowance(CN202310952977.2); Date of Mailing: Jan. 23, 2024.

*Primary Examiner* — Abigail A Risic
(74) *Attorney, Agent, or Firm* — W&G Law Group

(57) ABSTRACT

A scour protective device around piles with bidirectional flow power generation. A smooth water flow channel is formed by guide walls and baffle walls. A power generation device is placed at smallest section of the channel. The piles are wrapped by smooth normal distributional surfaces, and the water flow is divided to outsides of normal distributional surfaces. The guide walls at both ends are tangent to eliminate downflow of the incident flow surface and horseshoe vortex around the piles, to avoid local scour. The tidal current is introduced into the channel to accelerate, and contraction panels are further compressed to realize hydropower generation and improve the utilization rate of tidal energy. The swing door makes hydraulic turbines rotate in the same direction when the tide rises and falls, realizing reliable bidirectional hydropower generation. The system provides efficient and environmentally friendly renewable power for bridge lighting, signal lights and vessels.

7 Claims, 8 Drawing Sheets

(56) References Cited

U.S. PATENT DOCUMENTS

| | | | |
|---|---|---|---|
| 2011/0305510 A1* | 12/2011 | Durrant | E02B 17/0017 |
| | | | 405/15 |
| 2013/0195623 A1* | 8/2013 | Chung | F03B 17/063 |
| | | | 415/121.3 |
| 2016/0102441 A1* | 4/2016 | Simpson | E01D 19/00 |
| | | | 405/211 |
| 2017/0292839 A1* | 10/2017 | Lin | G08B 25/08 |
| 2021/0115634 A1* | 4/2021 | Saadatmanesh | E04C 5/06 |
| 2023/0051607 A1* | 2/2023 | Thatos | E02B 3/023 |

FOREIGN PATENT DOCUMENTS

| | | |
|---|---|---|
| CN | 208024505 U | 10/2018 |
| CN | 215907989 U | 2/2022 |
| KR | 20120032642 A | 4/2012 |

\* cited by examiner

SCOUR PROTECTIVE DEVICE AROUND PILES WITH BIDIRECTIONAL FLOW POWER GENERATION

CROSS-REFERENCE TO RELATED APPLICATIONS

The present application claims priority to Chinese Patent Application No. 202310952977.2, filed on Jul. 31, 2023, the content of which is incorporated herein by reference in its entirety.

TECHNICAL FIELD

The present disclosure belongs to the fields of ocean engineering, hydraulic engineering, civil engineering and power generation engineering, and in particular, to a scour protective device around piles with bidirectional flow power generation.

BACKGROUND

With the continuous development of maritime construction, tidal energy generation is receiving increasing attention. The improvement of technology brings broad application prospects to tidal energy generation. Tidal energy, as an inexhaustible renewable energy source that does not consume fuel, has no pollution, and is not affected by floods or low water. The ebb and flood create both kinetic and potential energy on the ocean surface. The potential energy manifests as the difference in water levels, while kinetic energy comes from the velocity of tidal currents represents. Electricity can be generated from the flow of water during both the rising and falling tides, with only slack tides being nonproductive. The abundant tidal resources make tidal energy generation a sustainable development direction with immeasurable value.

At the same time, the sea-crossing bridge is located in complex marine environments, susceptible to the combined effects of typhoon, strong tidal current and waves, which complicates erosion mechanism, making it difficult to accurately predict local erosion depths. The existing pier local scour protection mainly relies on riprap protection and retainer protection, but there are some shortcomings such as enhanced eddy current, poor protection effect, high cost and heavy workload. Especially under extreme hydrodynamic conditions, strong eddy current is formed around the riprap, exacerbating the scour of the bed surface, which does not have a protective effect, and may even worsen the situation.

In traditional hydropower generation water can only flow in one direction, while through bidirectional hydropower generation energy can be generated in both water flow directions. Bidirectional hydropower technology has a wide application prospect in the field of marine energy. At present, bidirectional hydropower technology faces some technical challenges, such as how to keep the generator running efficiently under different water flow directions and speeds, and how to prevent the pier from being eroded rapidly under extreme conditions. In order to overcome these challenges, it is beneficial to develop the technology that integrates pier protection with hydropower generation, improving the efficiency and scale of tidal energy generation, and realizing efficient utilization of tidal energy.

SUMMARY

The object of the present disclosure is to provide a scour protective device around piles which takes into account bidirectional flow power generation in view of the shortcomings of the prior art.

The object of the present disclosure is achieved through the following technical solution: a scour protective device with bidirectional flow power generation around piles includes a first smooth normal distributional surface guide wall, a first vertical baffle wall, a first flat-plate variable-diameter scour prevention bottom plate, a first variable-diameter semicircular cover plate, a first power generation device, a second smooth normal distributional surface guide wall, a second vertical baffle wall, a second flat-plate variable-diameter scour prevention bottom plate, a second variable-diameter semicircular cover plate and a second power generation device.

The first smooth normal distributional surface guide wall and the second smooth normal distributional surface guide wall wrap a pile and are symmetrically distributed.

An outer side of the first smooth normal distributional surface guide wall is provided with the first vertical baffle wall, a bottom of the first smooth normal distributional surface guide wall is provided with the first flat-plate variable-diameter scour prevention bottom plate, and a top of the first smooth normal distributional surface guide wall is the first variable-diameter semicircular cover plate; the first variable-diameter semicircular cover plate is smoothly connected to the first smooth normal distributional surface guide wall and the first vertical baffle wall by a quarter arc, respectively; the first flat-plate variable-diameter scour prevention bottom plate is smoothly connected to the first smooth normal distributional surface guide wall and the first vertical baffle wall, respectively; the first smooth normal distributional surface guide wall, the first vertical baffle wall, the first flat-plate variable-diameter scour prevention bottom plate and the first variable-diameter semicircular cover plate form a first smooth water flow channel; and the first power generation device is placed at a minimum section of the first smooth water flow channel.

The second smooth normal distributional surface guide wall and the second smooth distributional surface guide wall wrap around piles and are symmetrically distributed; an outer side of the second smooth normal distributional surface guide wall is provided with the second vertical baffle wall, a bottom of the second smooth normal distributional surface guide wall is provided with the second flat-plate variable-diameter scour prevention bottom plate, and a top of the second smooth normal distributional surface guide wall is provided with the second variable-diameter semicircular cover plate; the second variable-diameter semicircular cover plate is smoothly connected to the second smooth normal distributional surface guide wall and the second vertical baffle wall by a quarter arc, respectively; the second flat-plate type variable-diameter scour prevention bottom plate is smoothly connected to the second smooth normal distributional surface guide wall and the second vertical baffle wall, respectively; the second smooth normal distributional surface guide wall, the second vertical baffle wall, the second flat-plate variable-diameter scour prevention bottom plate and the second variable-diameter semicircular cover plate form a second smooth water flow channel; and the second power generation device is placed at a minimum section of the second smooth flow channel.

Further, the pile is a bridge pier or one in wind power foundation.

Further, a width $W(x)$ of any section of the first smooth water flow channel or the second smooth water flow channel is formed by taking a center of the pile as an origin, taking an ebb current direction as an x-axis positive direction, taking a direction perpendicular to a water flow in a horizontal plane as a y-axis positive direction, and taking an upward direction of an axis of the pile as a z-axis positive direction, and taking z=0 as an unwashed seabed plane:

$$W(x) = W_L - \frac{b}{\sqrt{2\pi}\sigma}\exp\left(\frac{x^2}{z\sigma^2}\right),$$

where $W_L$ represents a width of an inlet section, and $W_L = W(x=L)$; $\sigma$ represents a normal distribution curve variance; L represents a distance from the inlet to the minimum section; and b represents a amplification factor of the normal distribution curve.

b and $\sigma$ satisfy the following condition:

$$\frac{b}{\sqrt{2\pi}\sigma} = \frac{D}{2} + \Delta,$$

where D represents a diameter of the pile; $\Delta$ represents a thickness of the first smooth normal distributional surface guide wall or the second smooth normal distributional surface guide wall.

A flow area A(x) of any section in the first smooth water flow channel or the second smooth water flow channel satisfies the following equation:

$$A(x) = W(x)\left[\frac{\pi}{4}W(x) + H\right],$$

where H represents a water depth.

A flow area of the inlet section is:

$$A_L = A(L) = W_L\left(\frac{\pi W_L}{4} + H\right).$$

A flow area of the minimum section satisfies the following equation:

$$A_0 = A(x=0) = \left(W_L - \frac{b}{\sqrt{2\pi}\sigma}\right)\left[\frac{\pi}{4}\left(W_L - \frac{b}{\sqrt{2\pi}\sigma}\right) + H\right].$$

Further, the first power generation device includes a first rotating shaft, a first gear transmission system, a first hydraulic turbine, a first generator, a first contraction panel, a second contraction panel and a first support structure; the first rotating shaft is arranged inside the first support structure, and the first gear transmission system is connected to the first rotating shaft; an upper end of the first gear transmission system is connected with the first generator, and a lower end of the first gear transmission system is connected to the first hydraulic turbine; the first hydraulic turbine includes a first blade group; each blade of the first blade group is arc-shaped; the first contraction panel is perpendicular to a water-passing section, a side of the first contraction panel is connected to a side of the first support structure, another side of the first contraction panel is fixedly connected to the first vertical baffle wall, an upper end of the first contraction panel is fixedly connected to the first variable-diameter semicircular cover plate, and a lower end of the first contraction panel is fixedly connected to the first flat-plate variable-diameter scour prevention bottom plate; the second contraction panel is perpendicular to the water-passing section, a side of the second contraction panel (507) is connected to another side of the first support structure, another side of the second contraction panel is fixedly connected to the first smooth normal distributional surface guide wall, an upper end of the second contraction panel is fixedly connected to the first variable-diameter semicircular cover plate, and a lower end of the second contraction panel is fixedly connected to the first flat-plate variable-diameter scour prevention bottom plate; the first retractable panel is provided with a first swing door; and the second contraction panel is provided with a second swing door.

The second power generation device includes a second rotating shaft, a second gear transmission system, a second hydraulic turbine, a second generator, a third contraction panel, a fourth contraction panel and a second support structure; the second rotating shaft is arranged inside the second support structure, and the second gear transmission system is connected to the second rotating shaft; an upper end of the second gear transmission system is connected to the second generator and a lower end of the second gear transmission system is connected to the second hydraulic turbine; the second hydraulic turbine includes a second blade group; each blade in the second blade group is arc-shaped; the third contraction panel is perpendicular to the water-passing section, a side of the third contraction panel is connected to a side of the second support structure, another side of the third contraction panel is fixedly connected to the second vertical baffle wall, an upper end of the third contraction panel is fixedly connected to the second variable-diameter semicircular cover plate, and a lower end of the third contraction panel is fixedly connected to the second flat-plate variable-diameter scour prevention bottom plate; the fourth contraction panel is perpendicular to the water-passing section, a side of the fourth contraction panel is connected to the other side of the second support structure, another side of the fourth contraction panel is fixedly connected to the second smooth normal distributional surface guide wall, an upper end of the fourth contraction panel is fixedly connected to the second variable-diameter semicircular cover plate, and a lower end of the fourth contraction panel is fixedly connected to the second flat-plate variable-diameter scour prevention bottom plate; the third contraction panel is provided with a third swing door; and the fourth retractable panel is provided with a fourth swing door.

Further, a shortest distance between the first smooth normal distributional surface guide wall and the first vertical baffle wall or a shortest distance between the second smooth normal distributional surface guide wall and the second vertical baffle wall is n times the diameter of the pile, where n≥2.

Further, the first smooth normal distributional surface guide wall is tangentially connected to the second smooth normal distributional surface guide wall, a first smooth arc is arranged at a tangency joint at an end, and a second smooth arc is arranged at a tangency joint at another end; and the first smooth arc and the second smooth arc have same thickness, and both are less than ½ of the thickness of the first smooth normal distributional surface guide wall or the second smooth normal distributional surface guide wall.

Further, a kinetic energy $E_{max}$ of water per unit weight at the minimum section of the first smooth water flow channel or the second smooth water flow channel is: $E_{max} = E_L N^2$, where $E_L$ represents a kinetic energy of water per unit weight at the inlet section of the first smooth water flow channel or the second smooth water flow channel, and N represents a ratio of a maximum water flow velocity $v_{max}$ in the first smooth water flow channel or the second smooth water flow channel to a water flow velocity $v_L$ at the inlet section or a ratio of the flow area $A_L$ at the inlet section to a minimum cross-section area $A_{min}$, and $$N = \frac{v_{max}}{v_L} = \frac{A_L}{A_{min}}.$$

$A_{min}$ is set as $A_{min}=\alpha\beta A_0$, where $\alpha$ represents a lateral contraction coefficient of the first hydraulic turbine or the second hydraulic turbine, and $\alpha=r/R\in[0.25, 0.4]$, R represents a diameter of the first hydraulic turbine or the second hydraulic turbine, and r represents a flow length of any blade of the first hydraulic turbine or the second hydraulic turbine; and $\beta$ represents a vertical contraction coefficient of the first hydraulic turbine or the second hydraulic turbine, and $$\beta = \frac{h}{H} \in [0.4, 0.5],$$

and h represents a flow height that impacts the first hydraulic turbine or the second hydraulic turbine.

The present disclosure has the following beneficial effects:

(1) In the present disclosure, the smooth normal distributional surface guide walls on the left and right sides are symmetrically distributed, forming smooth water flow channels between the smooth normal distributional surface guide walls and the vertical baffle walls. Reverse smooth normal distributional surfaces on both sides of the pile, tangent to each other at a certain distance from the pile, with the tangent derivative consistent with the incoming flow direction, eliminating the dominant scouring factors such as descending water flow and horseshoe vortex around the pile, and eliminating the seabed scour caused by the above dominant factors and the increase of longitudinal flow velocity by combining the variable diameter scour prevention baseboard, thereby protecting local scour around piles.

(2) A smooth water flow channel is formed between the vertical baffle wall and the smooth normal distributional surface guide wall, and the smoothness of the normal distributional surface at any order can reduce the water flow resistance in the channel, thereby reducing the energy loss. The fluctuating tidal current energy scouring the seabed for two-way power generation is utilized to generate clean and renewable energy, with the advantages of high efficiency, environmental protection, energy saving and safety (3) The swing door in the contraction panel controls the water flow to pass in one direction, allowing the hydraulic turbine keeps to rotate in the same direction during tidal currents, thereby improving the utilization rate of tidal current energy.

(4) The first hydraulic turbine and the second hydraulic turbine are symmetrically arranged, with the torque outward during rotation, resulting in the lateral net torque of the pile close to zero, greatly reducing the lateral stress of the water flow to the pile and the torque of the rotating shaft.

(5) The present disclosure can be directly used for bridge deck lighting and upstream and downstream signal lights of piers, or for charging energy storage equipment for ships, thereby reducing environmental pollution.

REFERENCE SIGNS

Figure 1:
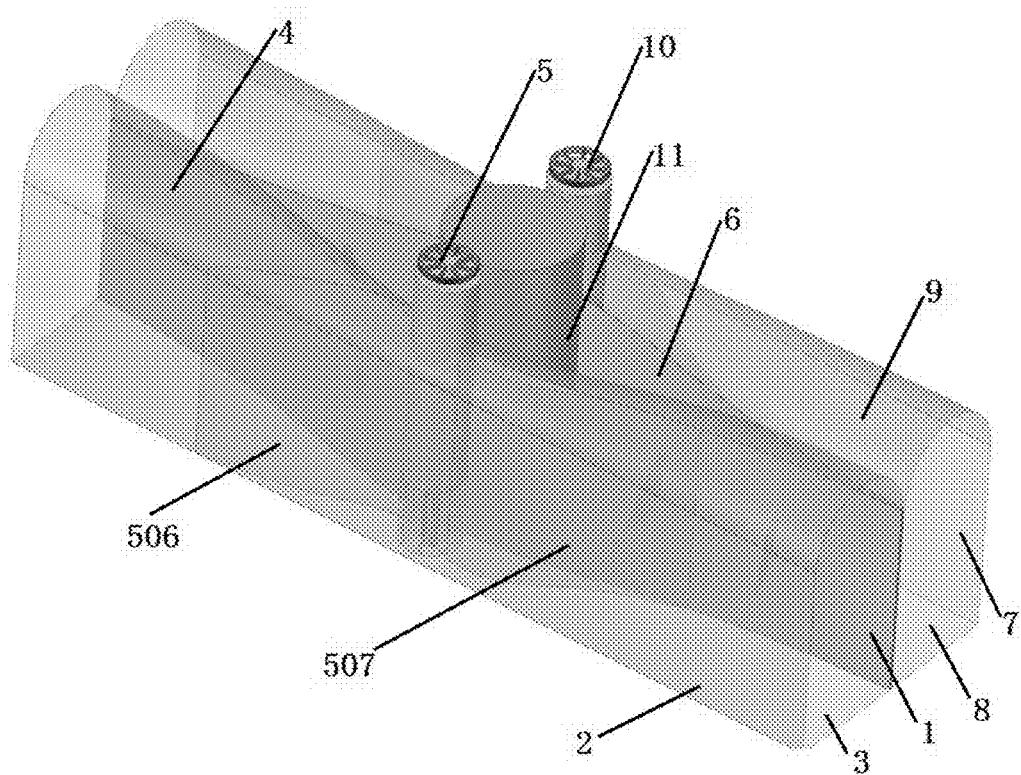
FIG. 1 is a schematic diagram of a forward three-dimensional structure of a scour protective device around piles with bidirectional flow power generation.
Figure 2:
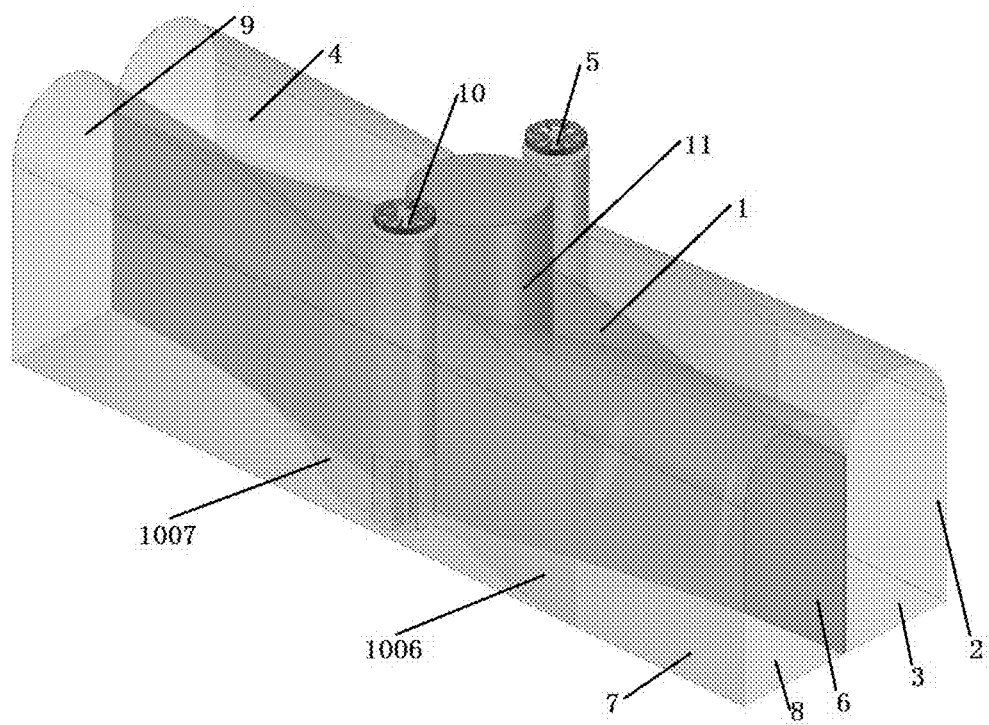
FIG. 2 is a schematic diagram of the reverse three-dimensional structure of a scour protective device around piles with bidirectional flow power generation.
Figure 3:
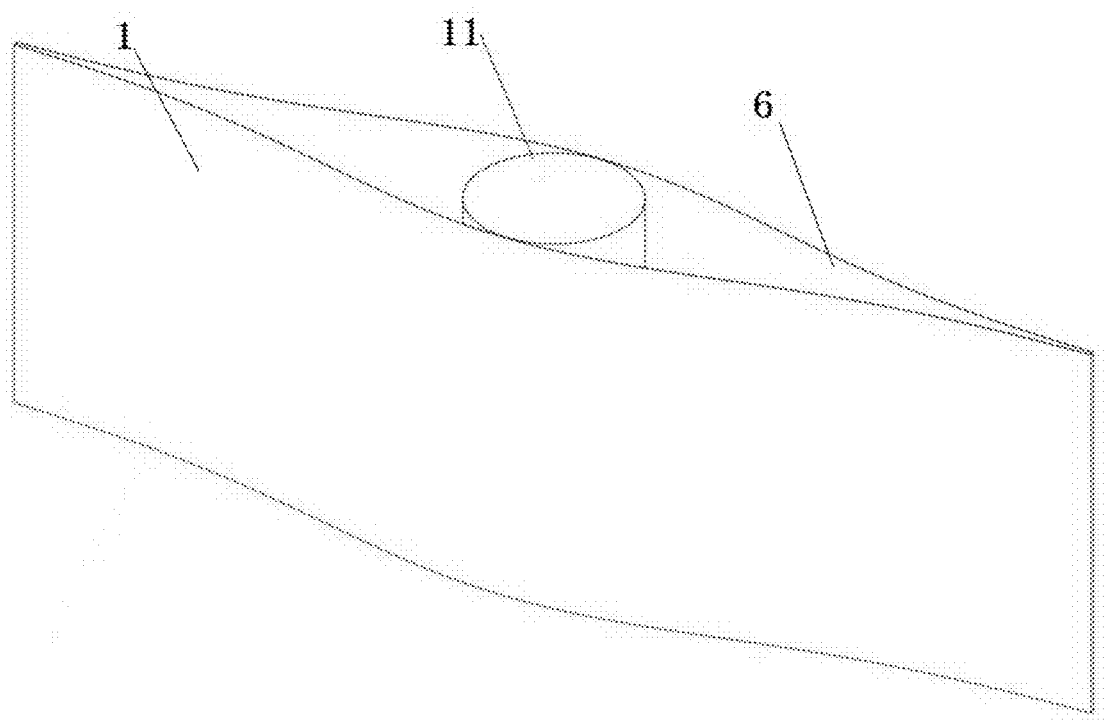
FIG. 3 is a schematic structural diagram of a first smooth normal distributional surface guide wall and a second smooth normal distributional surface guide wall.
Figure 4:
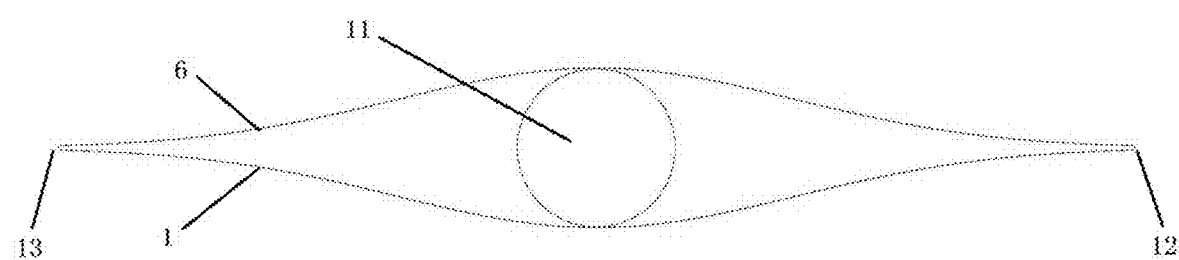
FIG. 4 is a top view of a first smooth normal distributional surface guide wall and a second smooth normal distributional surface guide wall.
Figure 5:
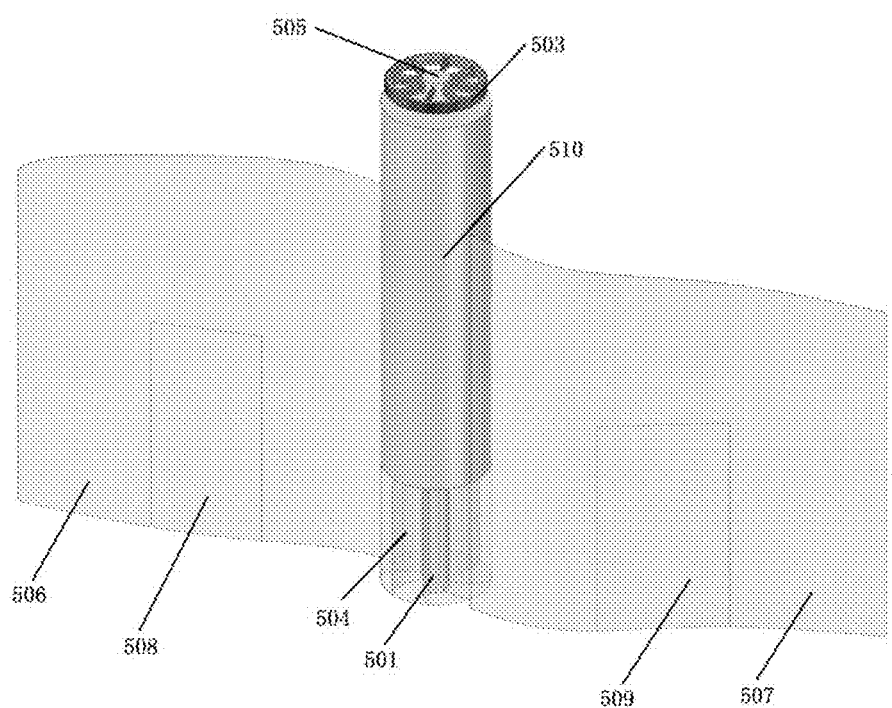
FIG. 5 is a schematic structural diagram of the first power generation device.
Figure 6:
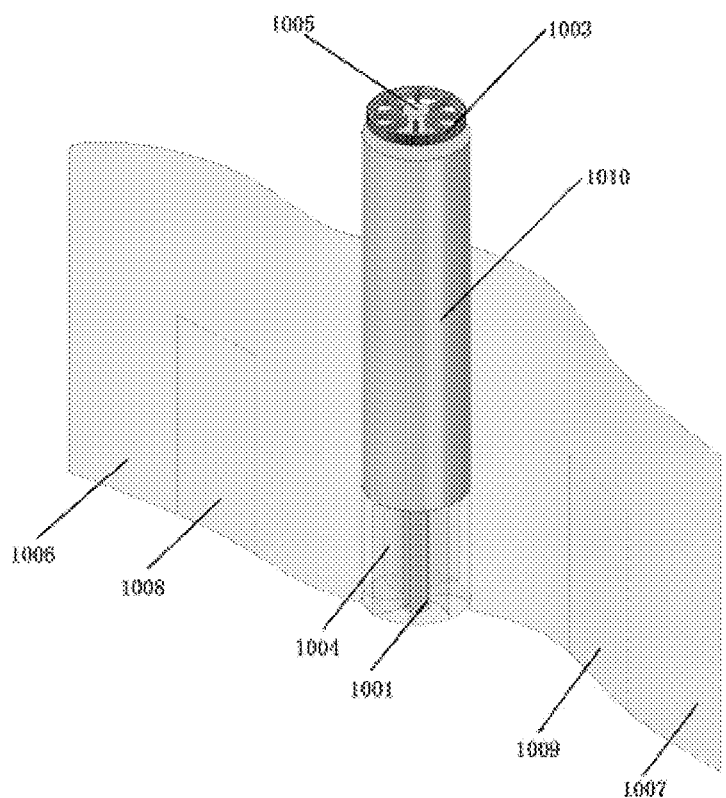
FIG. 6 is a schematic structural diagram of the second power generation device.

1—First smooth normal distributional surface guide wall; 2—First vertical baffle wall; 3—The first flat-plate variable-diameter scour prevention bottom plate; 4—First variable-diameter semicircular cover plate; 5—First power generation device; 6—Second smooth normal distributional surface guide wall; 7—Second vertical baffle wall; 8—Second flat-plate variable-diameter scour prevention bottom plate; 9—Second variable-diameter semicircular cover plate; 10—Second power generation device; 11—Pile; 12—First smooth arc; 13—Second smooth arc; 14—Fixed end; 15—Transmission device; 16—Reset spring; 17—Latch; 18—Rotating shaft; 19—Driving wheel; 501—First rotating shaft; 502—First blade group; 503—First gear transmission system; 504—First hydraulic turbine; 505—First generator; 506—First contraction panel; 507—Second contraction panel; 508—First swing door; 509—Second swing door; 510—First support structure; 1001—Second rotating shaft; 1002—Second blade group; 1003—Second gear transmission system; 1004—Second hydraulic turbine; 1005—Second generator; 1006—Third contraction panel; 1007—Fourth contraction panel; 1008—Third swing door; 1009—Fourth swing door; 1010—Second support structure.

DESCRIPTION OF EMBODIMENTS

In order to make the object, technical solution and advantages of the present disclosure more clear, the present disclosure will be further described in detail with the attached drawings and examples. It should be understood that the specific examples described here are only for explaining the present disclosure, and do not include all the embodiments. Based on the embodiments in the present disclosure, all other embodiments obtained by those skilled in the art without creative labor are within the protection scope of the present disclosure.

The scour protective device around piles with bidirectional flow power generation, integrates the dual functions of scour prevention and power generation around piers or wind power foundation piles, and has a broad application prospect and remarkable economic benefits.

Example 1

As shown in FIG. 1-FIG. 6, the present disclosure provides a scour protective device around piles with bidirectional flow power generation, which includes a first smooth normal distributional surface guide wall 1, a first vertical baffle wall 2, a first flat-plate variable-diameter scour prevention bottom plate 3, a first variable-diameter semicircular cover plate 4, a first power generation device 5, a second smooth normal distributional surface guide wall 6, a second vertical baffle wall 7, a second flat-plate variable-diameter scour prevention bottom plate 8, a second variable-diameter semicircular cover plate 9 and a second power generation device 10.

The first smooth normal distributional surface guide wall 1 and the second smooth normal distributional surface guide wall 6 wrap the pile 11 and are symmetrically distributed.

An outer side of the first smooth normal distributional surface guide wall 1 is the first vertical baffle wall 2, a bottom of the first smooth normal distributional surface guide wall 1 is the first flat-plate variable-diameter scour prevention bottom plate 3, and a top of the first smooth normal distributional surface guide wall 1 is the first variable-diameter semicircular cover plate 4; the first variable-diameter semicircular cover plate 4 is respectively and smoothly connected with the first smooth normal distributional surface guide wall 1 and the first vertical baffle wall 2 by a quarter arc; the first flat-plate variable-diameter scour prevention bottom plate 3 is respectively and smoothly connected with the first smooth normal distributional surface guide wall 1 and the first vertical baffle wall 2; the first smooth normal distributional surface guide wall 1, the first vertical baffle wall 2, the first flat-plate variable-diameter scour prevention bottom plate 3 and the first variable-diameter semicircular cover plate 4 form a first smooth water flow channel; a first power generation device 5 is placed at a minimum section of the first smooth water flow channel.

An outer side of the second smooth normal distributional surface guide wall 6 is the second vertical baffle wall 7, a bottom thereof is the second flat-plate variable-diameter scour prevention bottom plate 8, and a top thereof is the second variable-diameter semicircular cover plate 9; the second variable-diameter semicircular cover plate 9 is respectively and smoothly connected with the second smooth normal distributional surface guide wall 6 and the second vertical baffle wall 7 by a quarter arc; the second flat-plate type variable-diameter scour prevention bottom plate 8 is respectively and smoothly connected with the second smooth normal distributional surface guide wall 6 and the second vertical baffle wall 7; the second smooth normal distributional surface guide wall 6, the second vertical baffle wall 7, the second flat-plate variable-diameter scour prevention bottom plate 8 and the second variable-diameter semicircular cover plate 9 form a second smooth water flow channel; a second power generation device 10 is placed a position with a minimum section of the second smooth water flow channel.

The fluctuating tidal current is introduced into the first smooth water flow channel and the second smooth water flow channel to eliminate the dominant scouring factors such as descending water flow and weakening pile horseshoe vortex, eliminate the seabed scouring caused by the above dominant factors and the increase of longitudinal water flow, and prevent local scouring around the pile e periphery.

The pile 11 is a pier pile or a wind power foundation pile.

The center of the pile 11 is taken as an origin, an ebb current direction is taken as an x-axis positive direction, a direction perpendicular to the water flow in the horizontal plane is taken as a y-axis positive direction, and an upward direction of an axis of the pile is taken as a z-axis positive direction, and z=0 is an unwashed seabed plane, thereby forming a width W(x) of any section of the first smooth water flow channel or the second smooth water flow channel:

$$(x) = W_L - \frac{b}{\sqrt{2\pi}\sigma}\exp\left(\frac{x^2}{z\sigma^2}\right),$$

where $W_L$ represents a width of an inlet section, and $W_L = W(x=L)$; $\sigma$ represents a normal curve variance; L represents a distance from the inlet section to the minimum section; and b represents an amplification factor of the normal distribution curve.

The b and $\sigma$ satisfy the following conditions:

$$\frac{b}{\sqrt{2\pi}\sigma} = \frac{D}{2} + \Delta,$$

where D represents a diameter of the pile 11; $\Delta$ represents the thickness of the first smooth normal distributional surface guide wall or the second smooth normal distributional surface guide wall, and may be set as 10 cm.

The flow area A(x) of any section in the first smooth water flow channel or the second smooth water flow channel satisfies the following formula:

$$A(x) = W(x)\left[\frac{\pi}{4}W(x) + H\right],$$

where H represents a water depth.

The flow area of the inlet section is:

$$A_L = A(L) = W_L\left(\frac{\pi W_L}{4} + H\right).$$

The flow area of the minimum section is:

$$A_0 = A(x=0) = \left(W_L - \frac{b}{\sqrt{2\pi}\sigma}\right)\left[\frac{\pi}{4}\left(W_L - \frac{b}{\sqrt{2\pi}\sigma}\right) + H\right].$$

Example 2

On the basis of Example 1, the first power generation device 5 includes a first rotating shaft 501, a first gear transmission system 503, a first hydraulic turbine 504, a first generator 505, a first contraction panel 506, a second contraction panel 507 and a first support structure 510; the first rotating shaft 501 is arranged inside the first support structure 510, and the first gear transmission system 503 is connected with the first rotating shaft 501; an upper end of the first gear transmission system 503 is connected with the first generator 505, and a lower end thereof is connected with the first hydraulic turbine 504; the first hydraulic turbine 504 includes a first blade group 502; each blade in the first blade group 502 is arc-shaped; the first contraction panel 506 is perpendicular to a water-passing section, with one side being connected with one side of the first support structure 510, the other side being fixedly connected with the first vertical baffle wall 2, an upper end being fixedly connected with the first variable-diameter semicircular cover plate 4, and a lower end being fixedly connected with the first flat-plate variable-diameter scour prevention bottom plate 3; the second contraction panel 507 is perpendicular to the water-passing section, with one side being connected with the other side of the first support structure 510, the other side being fixedly connected with the first smooth normal distributional surface guide wall 1, an upper end being fixedly connected with the first variable-diameter semicircular cover plate 4, and a lower end being fixedly connected with the first flat-plate variable-diameter scour prevention bottom plate 3; the first retractable panel 506 is provided with a first swing door 508; and the second contraction panel 507 is provided with a second swing door 509.

The second power generation device 10 includes a second rotating shaft 1001, a second gear transmission system 1003, a second hydraulic turbine 1004, a second generator 1005, a third contraction panel 1006, a fourth contraction panel 1007 and a second support structure 1010; the second rotating shaft 1001 is arranged inside the second support structure 1010, and the second gear transmission system 1003 is connected with the second rotating shaft 1001; an upper end of the second gear transmission system 1003 is connected with the second generator 1005 and a lower end thereof is connected with the second hydraulic turbine 1004; the second hydraulic turbine 1004 includes a second blade group 1002; each blade in the second blade group 1002 is arc-shaped; the third contraction panel 1006 is perpendicular to the water-passing section, with one side being connected with one side of the second support structure 1010, the other side being fixedly connected with the second vertical baffle wall 7, an upper end being fixedly connected with the second variable-diameter semicircular cover plate 9, and a lower end being fixedly connected with the second flat-plate variable-diameter scour prevention bottom plate 8; the fourth contraction panel 1007 is perpendicular to the water-passing section, with one side being connected with the other side of the second support structure 1010, the other side being fixedly connected with the second smooth normal distributional surface guide wall 6, an upper end being fixedly connected with the second variable-diameter semicircular cover plate 9, and a lower end being fixedly connected with the second flat-plate variable-diameter scour prevention bottom plate 8; the third contraction panel 1006 is provided with a third swing door 1008; and the fourth retractable panel 1007 is provided with a fourth swing door 1009.

The shortest distance between the first smooth normal distributional surface guide wall 1 and the first vertical baffle wall 2 or a shortest distance between the second smooth normal distributional surface guide wall 6 and the second vertical baffle wall 7 is n times the diameter of the pile 11, where n≥2.

The first smooth normal distributional surface guide wall 1 is tangentially connected with the second smooth normal distributional surface guide wall 6 at a certain distance from the pile 11, with a first smooth arc 12 at a tangency joint at one end and a second smooth arc 13 at a tangency joint at the other end; the thicknesses of the first smooth arc 12 and the second smooth arc 13 are identical, and both are less than ½ of the thickness Δ of the first smooth normal distributional surface guide wall or the second smooth normal distributional surface guide wall. The flood current or ebb current with a width of $2W_L$ is alternately introduced into the first smooth water flow channel and the second smooth water flow channel, so that the ratio of the incident flow area at the front end of the smooth normal distributional surface guide wall to the incident flow area of the pile is less than Δ/D, so as to avoid local scour of the pile caused by downflow and horseshoe vortex. At the same time, the water energy entering the first smooth water flow channel and the second smooth water flow channel is used for power generation and no longer scours the seabed. The tangent derivative is consistent with the incoming flow direction to eliminate downflow and horseshoe vortex. The smoothness of the normal distribution surface in any order can reduce the resistance of water flow in the channel, thus reducing the energy loss.

Let the kinetic energy of water flow per unit weight be $$E = \frac{v^2}{2g},$$

then the kinetic energy $E_{max}$ of water per unit weight at the minimum section of the first smooth water flow channel or the second smooth water flow channel is: $E_{max}=E_L N^2$, where $E_L$ is the kinetic energy of water per unit weight at the inlet section of the first smooth water flow channel or the second smooth water flow channel, and N is a ratio of a maximum water flow velocity $v_{max}$ in the channel to a water flow velocity $v_L$ at the inlet section or a ratio of the flow area $A_L$ at the inlet section to a minimum water cross-section area $A_{min}$, and $$N = \frac{v_{max}}{v_L} = \frac{A_L}{A_{min}}.$$

$A_{min}$ is set as $A_{min}=\alpha\beta A_0$, where α represents a lateral contraction coefficient of the first hydraulic turbine 504 or the second hydraulic turbine 1004, and $$\alpha = \frac{r}{R} \in [0.25, 0.4],$$

R represents a diameter of the first hydraulic turbine 504 or the second hydraulic turbine 1004, and r represents a flow length of any blade of the first hydraulic turbine 504 or the second hydraulic turbine 1004; and β represents a vertical contraction coefficient of the first hydraulic turbine 504 or the second hydraulic turbine 1004, and $$\beta = \frac{h}{H} \in [0.4, 0.5],$$

and h represents a flow height that impacts the first hydraulic turbine 504 or the second hydraulic turbine 1004.

Working principle: the rotation of the first hydraulic turbine 504 and the second hydraulic turbine 1004 mainly depends on the torque generated by the pressure difference between the concave and convex surfaces of the blades.

Figure 7:
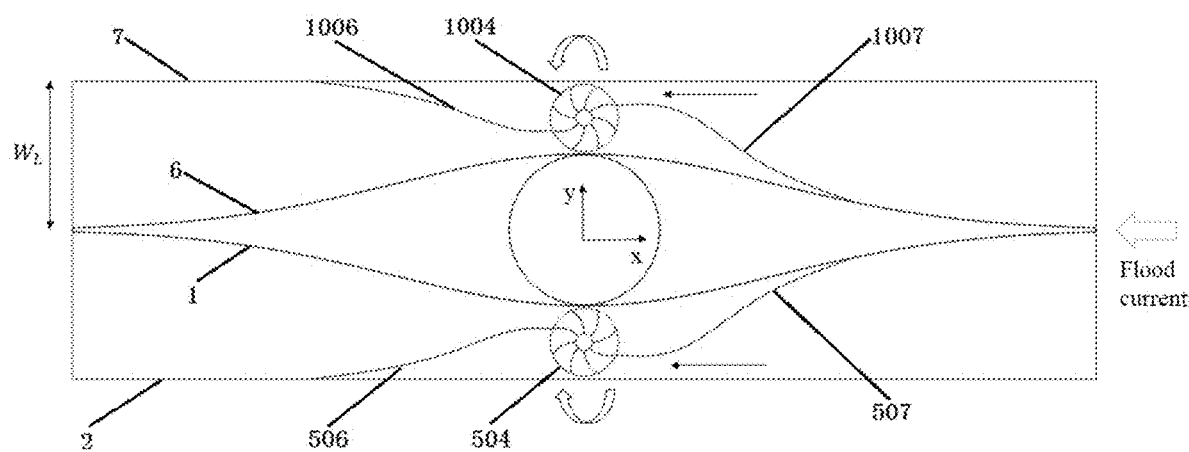
FIG. 7 is a plan view of a scour protective device around piles with bidirectional flow power generation at rising tide.

As shown in FIG. 7, when the tide rises, the water flows into one end of the first smooth water flow channel from right to left, and the second swing door 509 is automatically closed by the water flow from right to left. At this time, the second contraction panel 507 completely blocks the water flow and makes the water flow to the first contraction panel 506 through the first hydraulic turbine 504, while the first swing door 508 is automatically opened by the water flow from right to left, and the water flows to the other end of the first smooth water flow channel from right to left through the first swing door 508. At this time, the incident flow side of the first hydraulic turbine 504 is concave semi-circular blades, and the pressure inside the concave semi-circular blades is relatively large, thus driving the blades to rotate, so that the first hydraulic turbine 504 rotates clockwise, thereby driving the first generator 505 to generate electricity through the first gear transmission system 503.

When the tide rises, the water flows into one end of the second smooth water flow channel from right to left, and the fourth swing door 1009 is automatically closed by the water flow from right to left. At this time, the fourth contraction panel 1007 completely blocks the water flow, making the water flow to the third contraction panel 1006 through the second hydraulic turbine 1004, while the third swing door 1008 is automatically opened by the water flow from right to left, and the water flows to the other end of the second smooth water flow channel from right to left through the third swing door 1008. At this time, the incident flow side of the second hydraulic turbine 1004 is concave semi-circular blades, and the pressure inside the concave semi-circular blades is relatively large, thus driving the blades to rotate, so that the second hydraulic turbine 1004 rotates counterclockwise, thereby driving the second generator 1005 to generate electricity through the second gear transmission system 1003.

Figure 8:
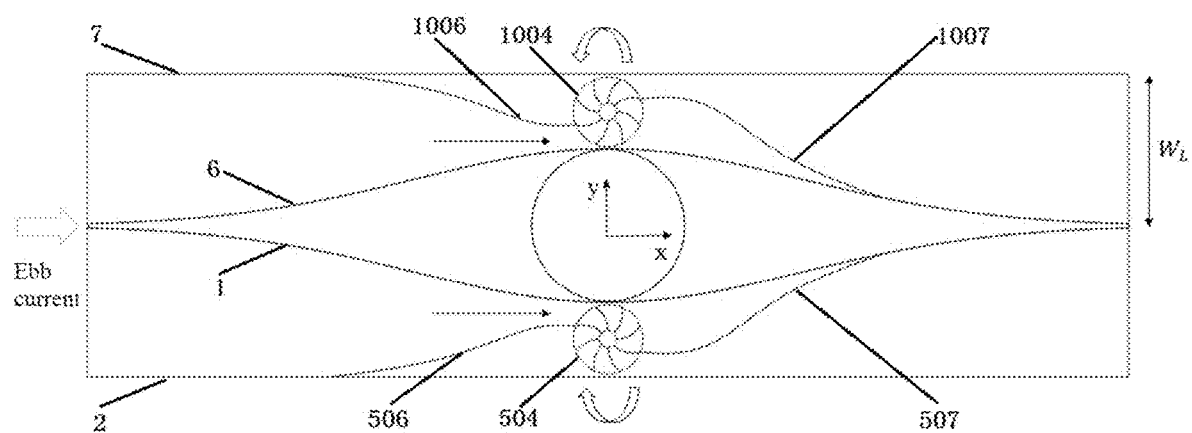
FIG. 8 is a plan view of a scour protective device around piles with bidirectional flow power generation at falling tide.

As shown in FIG. 8, when the ebb tide, the water flows into one end of the first smooth water flow channel from left to right, and the first swing door 508 is automatically closed by the water flow from left to right. At this time, the first contraction panel 506 completely blocks the water flow, making the water flow to the second contraction panel 507 through the first hydraulic turbine 504, while the second swing door 509 is automatically opened by the water flow from left to right, and the water flows to the other end of the first smooth water flow channel from left to right through the second swing door 509. At this time, the incident flow side of the first hydraulic turbine 504 is further a concave semi-circular blade, which makes the first hydraulic turbine 504 rotate clockwise, thus driving the first generator 505 to generate electricity through the first gear transmission system 503.

When the ebb tide, the water flows into one end of the second smooth water flow channel from left to right, and the third swing door 1008 is automatically closed by the water flow from left to right. At this time, the third contraction panel 1006 completely blocks the water flow and makes the water flow to the fourth contraction panel 1007 through the second hydraulic turbine 1004, while the fourth swing door 1009 is automatically opened by the water flow from left to right, and the water flows to the other side of the second smooth water flow channel from left to right through the fourth swing door 1009. At this time, the incident flow side of the second hydraulic turbine 1004 is concave semi-circular blades, which makes the second hydraulic turbine 1004 rotate counterclockwise, thus driving the second generator 1005 to generate electricity through the second gear transmission system 1003.

The swing door is used to control the direction of water flow. Based on the principle of one-way check valve, the swing door ensures the one-way passage of water flow, and the rotating shaft is driven by the pressure difference between upstream and downstream fluid to make the latch 23 move in one direction to open the valve; when the fluid pressure difference is reversed, the reset spring elastically deforms and automatically locks the swing door to prevent water from flowing in the opposite direction.

Figure 9A:
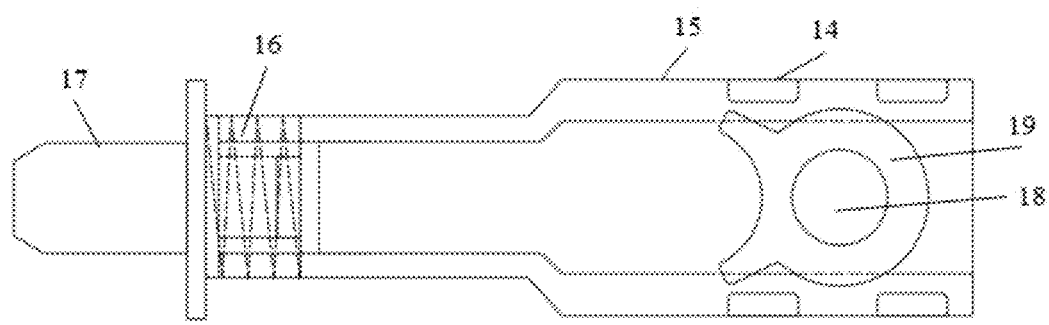
FIG. 9($a$)-9($b$) is a schematic structural view of the swing door, in which FIG. 9($a$) is a schematic structural view when the swing door is closed and FIG. 9($b$) is a schematic structural view when the swing door is opened.
Figure 9B:
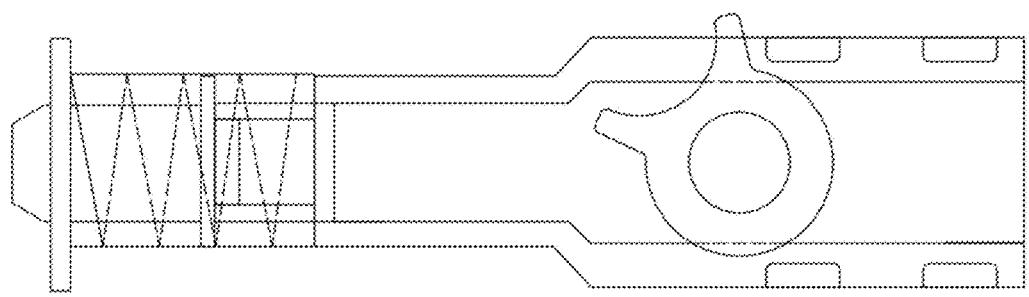

As shown in FIG. 9(a) and FIG. 9(b), the swing door includes a position locking device and an arc valve, and the position locking device includes a locking groove, a locking member and a driving device which cooperate with each other. The locking member includes a latch 17, a fixed end 14, a transmission device 15 and a reset spring 16. The driving device includes a rotating shaft 18 and a driving wheel 19. The rotating shaft 18 is controlled by a hydraulic sensor, which can trigger the rotating shaft to rotate when the water level reaches a certain height at rising tide, and drive the transmission device 15 to contract, thus unlocking the swing door. At falling tide, the swing door can be locked due to the structural pressure and the position locking device, and the backflow of water can be prevented. A rubber band buffer layer is arranged in the position locking device to reduce the resistance, which needs to be closely combined to ensure the test strength and achieve the installation purpose. No matter whether the tide is high or low, the rotation direction of the first hydraulic turbine 504 is clockwise, and the rotation direction of the second hydraulic turbine 1004 is counterclockwise, keeping the same rotation direction, thus improving the utilization rate of tidal energy. The structural schematic diagram of the swing door is shown in FIG. 9(a) when it is closed and FIG. 9(b) when it is opened.

Figure 10:
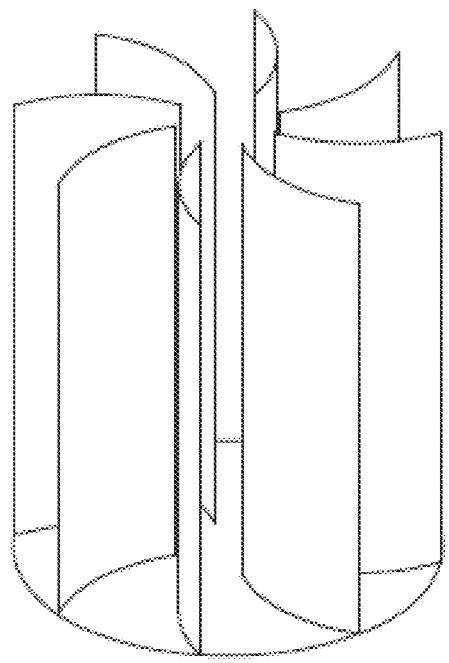
FIG. 10 is a schematic structural view of the first blade group or the second blade group.

As shown in FIG. 10, the number of blades in the first blade group 502 or the second blade group 1002 can be selected from 8 to 10, so that the pressure distribution on both sides is more uniform, the water flow around the blades is more uniform, cavitation is not easy to occur, and stable torque and high efficiency are easy to obtain.

The impact of water flow on the rotating shaft is avoided, and rotating shafts with different radii are adopted to improve the transmission efficiency. The gear transmission system adopts a high-efficiency cylindrical gear, and the power generation efficiency is improved by high-precision meshing between the driving wheel and the driven wheel. The design of a suitable gear transmission ratio can be determined according to the kinetic energy of water flow and the output power of the generator.

The generator needs to choose the appropriate power and speed according to the actual needs to ensure the stable output of electric energy. At the same time, it is necessary to have good corrosion resistance and durability to ensure long-term stable power generation output.

In the process of implementation, the power generation device can be adjusted and optimized as needed to improve the energy utilization efficiency. At the same time, the bidirectional hydraulic generator set should have good corrosion resistance and durability to ensure long-term stable power generation output. For the setting of the base, power generation devices and power storage devices can be installed, and at the same time, the power generation system can be connected with offshore ships and other equipment for use.

It can be understood by those skilled in the art that the above is only a preferred example of the present disclosure, and it is not used to limit the present disclosure. Although the present disclosure has been described in detail with reference to the above examples, it is still possible for those skilled in the art to modify the technical solution described in the above examples or replace some technical features equally. Any modification and equivalent substitution within the spirit and principle of the present disclosure shall be included in the scope of protection of the present disclosure.

What is claimed is:

1. A scour protective device around piles with bidirectional flow power generation, comprising a first smooth normal distributional surface guide wall, a first vertical baffle wall, a first flat-plate variable-diameter scour prevention bottom plate, a first variable-diameter semicircular cover plate, a first power generation device, a second smooth normal distributional surface guide wall, a second vertical baffle wall, a second flat-plate variable-diameter scour prevention bottom plate, a second variable-diameter semicircular cover plate and a second power generation device;

wherein the first smooth normal distributional surface guide wall and the second smooth normal distributional surface guide wall wrap a pile and are symmetrically distributed;

wherein an outer side of the first smooth normal distributional surface guide wall is provided with the first vertical baffle wall, a bottom of the first smooth normal distributional surface guide wall is provided with the first flat-plate variable-diameter scour prevention bottom plate, and a top of the first smooth normal distributional surface guide wall is provided with the first variable-diameter semicircular cover plate; the first variable-diameter semicircular cover plate is smoothly connected to the first smooth normal distributional surface guide wall and the first vertical baffle wall by a quarter arc, respectively; the first flat-plate variable-diameter scour prevention bottom plate is smoothly connected to the first smooth normal distributional surface guide wall and the first vertical baffle wall, respectively; the first smooth normal distributional surface guide wall, the first vertical baffle wall, the first flat-plate variable-diameter scour prevention bottom plate and the first variable-diameter semicircular cover plate form a first smooth water flow channel; and the first power generation device is placed at a minimum section of the first smooth water flow channel; and wherein an outer side of the second smooth normal distributional surface guide wall is provided with the second vertical baffle wall, a bottom of the second smooth normal distributional surface guide wall is provided with the second flat-plate variable-diameter scour prevention bottom plate, and a top of the second smooth normal distributional surface guide wall is provided with the second variable-diameter semicircular cover plate; the second variable-diameter semicircular cover plate is smoothly connected to the second smooth normal distributional surface guide wall and the second vertical baffle wall by a quarter arc, respectively; the second flat-plate type variable-diameter scour prevention bottom plate is smoothly connected to the second smooth normal distributional surface guide wall and the second vertical baffle wall, respectively; the second smooth normal distributional surface guide wall, the second vertical baffle wall, the second flat-plate variable-diameter scour prevention bottom plate and the second variable-diameter semicircular cover plate form a second smooth water flow channel; and the second power generation device is placed a at a minimum section of the second smooth water flow channel.

2. The scour protective device around piles with bidirectional flow power generation according to claim 1, wherein the pile is a bridge pier or one in the wind power foundation.

3. The scour protective device around piles with bidirectional flow power generation according to claim 1, wherein a section width W(x) of the first smooth water flow channel or the second smooth water flow channel is formed by taking a center of the pile as origin, taking an ebb current direction as positive direction of x-axis, taking a direction perpendicular to the ebb current in horizontal plane as a positive direction of y-axis, and taking an upward direction along axis of the pile as positive direction of z-axis, and taking z=0 as an unwashed seabed plane:

$$W(x) = W_L - \frac{b}{\sqrt{2\pi}\,\sigma}\exp\left(\frac{x^2}{z\sigma^2}\right),$$

where $W_L=W(x=L)$ represents width of an inlet section; $\sigma$ represents variance of a normal distributional curve; L represents a distance from the inlet section to the minimum section; and b represents a amplification factor of the normal distributional curve;

b and $\sigma$ satisfy a condition described as $$\frac{b}{\sqrt{2\pi}\,\sigma} = \frac{D}{2} + \Delta,$$

where D represents diameter of the pile; and $\Delta$ represents thickness of the first or the second smooth normal distributional surface guide wall;

flow area A(x) of a section in the first smooth water flow channel or the second smooth water flow channel satisfies equation $$A(x) = W(x)\left[\frac{\pi}{4}W(x) + H\right],$$

where H represents water depth;
flow area of the inlet section is:

$$A_L = A(L) = W_L\left(\frac{\pi W_L}{4} + H\right),$$

flow area of the minimum section satisfies equation $$A_0 = A(x=0) = \left(W_L - \frac{b}{\sqrt{2\pi}\,\sigma}\right)\left[\frac{\pi}{4}\left(W_L - \frac{b}{\sqrt{2\pi}\,\sigma}\right) + H\right].$$

4. The scour protective device around piles with bidirectional flow power generation according to claim 3, wherein the first power generation device comprises a first rotating shaft, a first gear transmission system, a first hydraulic turbine, a first generator, a first contraction panel, a second contraction panel and a first support structure; the first rotating shaft is arranged inside the first support structure, and the first gear transmission system is connected to the first rotating shaft; an upper end of the first gear transmission system is connected to the first generator, and a lower end of the first gear transmission system is connected to the first hydraulic turbine; the first hydraulic turbine comprises a first blade group; each blade of the first blade group is arc-shaped; the first contraction panel is perpendicular to a water-passing section, a side of the first contraction panel is connected to a side of the first support structure, another side of the first contraction panel is fixedly connected to the first vertical baffle wall, an upper end of the first contraction panel is fixedly connected to the first variable-diameter semicircular cover plate, and a lower end of the first contraction panel is fixedly connected to the first flat-plate variable-diameter scour prevention bottom plate; the second contraction panel is perpendicular to the water-passing section, a side of the second contraction panel is connected to another side of the first support structure, another side of the second contraction panel is fixedly connected to the first smooth normal distributional surface guide wall, an upper end of the second contraction panel is fixedly connected to the first variable-diameter semicircular cover plate, and a lower end of the second contraction panel is fixedly connected to the first flat-plate variable-diameter scour prevention bottom plate; the first retractable panel is provided with a first swing door; and the second contraction panel is provided with a second swing door; and wherein the second power generation device comprises a second rotating shaft, a second gear transmission system, a second hydraulic turbine, a second generator, a third contraction panel, a fourth contraction panel and a second support structure; the second rotating shaft is arranged inside the second support structure, and the second gear transmission system is connected to the second rotating shaft; an upper end of the second gear transmission system is connected to the second generator and a lower end of the second gear transmission system is connected to the second hydraulic turbine; the second hydraulic turbine comprises a second blade group; each blade of the second blade group is arc-shaped; the third contraction panel is perpendicular to the water-passing section, a side of the third contraction panel is connected to a side of the second support structure, another side of the third contraction panel is fixedly connected to the second vertical baffle wall, an upper end of the third contraction panel is fixedly connected to the second variable-diameter semicircular cover plate, and a lower end of the third contraction panel is fixedly connected to the second flat-plate variable-diameter scour prevention bottom plate; the fourth contraction panel is perpendicular to the water-passing section, a side of the fourth contraction panel is connected to the other side of the second support structure, another side of the fourth contraction panel is fixedly connected to the second smooth normal distributional surface guide wall, an upper end of the fourth contraction panel is fixedly connected to the second variable-diameter semicircular cover plate, and a lower end of the fourth contraction panel is fixedly connected to the second flat-plate variable-diameter scour prevention bottom plate; the third contraction panel is provided with a third swing door; and the fourth retractable panel is provided with a fourth swing door.

5. The scour protective device around piles with bidirectional flow power generation according to claim 4, wherein a shortest distance between the first smooth normal distributional surface guide wall and the first vertical baffle wall or a shortest distance between the second smooth normal distributional surface guide wall and the second vertical baffle wall is n times the diameter of the pile, where n≥2.

6. The scour protective device around piles with bidirectional flow power generation according to claim 5, wherein the first smooth normal distributional surface guide wall is tangentially connected to the second smooth normal distributional surface guide wall, a first smooth arc is arranged at a tangency joint at an end, and a second smooth arc is arranged at a tangency joint at another end; and the first smooth arc and the second smooth arc have same thickness, and both are less than ½ of the thickness of the first smooth normal distributional surface guide wall or the second smooth normal distributional surface guide wall.

7. The scour protective device around piles with bidirectional flow power generation according to claim 6, wherein kinetic energy $E_{max}$ of water per unit weight at the minimum section of the first or the second smooth water flow channel is calculated by $E_{max}=E_L N^2$, where $E_L$ represents kinetic energy of water per unit weight at the inlet section of the first or the second smooth water flow channel, and N represents a ratio of a maximum water flow velocity $v_{max}$ in the first or the second smooth water flow channel to a water flow velocity $v_L$ at the inlet section or a ratio of the flow area $A_L$ at the inlet section to a minimum water cross-section area $A_{min}$, namely $$N = \frac{v_{max}}{v_L} = \frac{A_L}{A_{min}};$$

and $A_{min}$ is set as $A_{min}=\alpha\beta A_0$, where $\alpha$ represents a lateral contraction coefficient of the first hydraulic turbine or the second hydraulic turbine, and a is calculated by $\alpha=r/R\epsilon[0.25, 0.4]$, R represents a diameter of the first hydraulic turbine or the second hydraulic turbine, and r represents a flow length of any blade of the first hydraulic turbine or the second hydraulic turbine; and $\beta$ represents a vertical contraction coefficient of the first hydraulic turbine or the second hydraulic turbine, and $\beta$ is calculated by $\beta=h/H\epsilon[0.4, 0.5]$, and h represents a flow height that impacts the first hydraulic turbine or the second hydraulic turbine.

\* \* \* \* \*